(12) United States Patent
Chiba

(10) Patent No.: US 10,469,638 B2
(45) Date of Patent: Nov. 5, 2019

(54) BATTERY COVER STRUCTURE AND PORTABLE TERMINAL

(71) Applicant: CASIO COMPUTER CO., LTD., Shibuya-ku, Tokyo (JP)

(72) Inventor: Yasunori Chiba, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/129,759

(22) Filed: Sep. 12, 2018

(65) Prior Publication Data

US 2019/0082041 A1    Mar. 14, 2019

(30) Foreign Application Priority Data

Sep. 13, 2017  (JP) ................. 2017-175951

(51) Int. Cl.
*H01M 2/00* (2006.01)
*H04M 1/02* (2006.01)
*H01M 2/10* (2006.01)

(52) U.S. Cl.
CPC ....... *H04M 1/0262* (2013.01); *H01M 2/1066* (2013.01); *H01M 2/1094* (2013.01); *H01M 2220/30* (2013.01)

(58) Field of Classification Search
CPC ............ H01M 2/1066; H01M 2/1094; H01M 2/1061; H01M 2/1022; H01M 2/10; H01M 2/1005; H01M 2/04; H04M 2001/0204; H04M 1/0262; H04M 1/026; H04M 1/0249; H04M 1/0202
USPC ....... 361/679.01, 679.02; 429/187, 163, 171, 429/172, 173
See application file for complete search history.

(56) References Cited

U.S. PATENT DOCUMENTS

| 6,532,152 | B1* | 3/2003 | White | G02F 1/133308 |
| | | | | 361/692 |
| 9,462,095 | B2* | 10/2016 | Midori | H04M 1/18 |
| 9,535,459 | B2* | 1/2017 | Lee | G06F 1/1635 |
| 9,560,783 | B2* | 1/2017 | Kang | G06F 1/1635 |
| 2012/0162881 | A1* | 6/2012 | Usui | H01M 2/1066 |
| | | | | 361/679.01 |
| 2013/0193006 | A1* | 8/2013 | Bergreen | A45C 11/22 |
| | | | | 206/37 |
| 2013/0252061 | A1* | 9/2013 | Kim | H01M 2/1022 |
| | | | | 429/100 |
| 2013/0265715 | A1* | 10/2013 | Bae | G06F 1/1656 |
| | | | | 361/679.55 |

FOREIGN PATENT DOCUMENTS

| JP | 2004157240 A | 6/2004 |
| JP | 2012009771 A | 1/2012 |
| JP | 2012178317 A | 9/2012 |

* cited by examiner

*Primary Examiner* — Anthony M Haughton
(74) *Attorney, Agent, or Firm* — Holtz, Holtz & Volek PC

(57) ABSTRACT

A battery cover structure including a battery accommodation section which has a battery insertion/removal opening provided on one surface side of a housing, a battery cover which openably covers the battery insertion/removal opening, and a gasket which is fitted into a groove provided in a periphery of the battery cover or a periphery of the battery insertion/removal opening so as to hermetically seal the battery accommodation section by the battery cover, in which the lateral pressure to the gasket fitted into the groove is greater in corner areas of the gasket than in linear areas of the gasket.

16 Claims, 10 Drawing Sheets

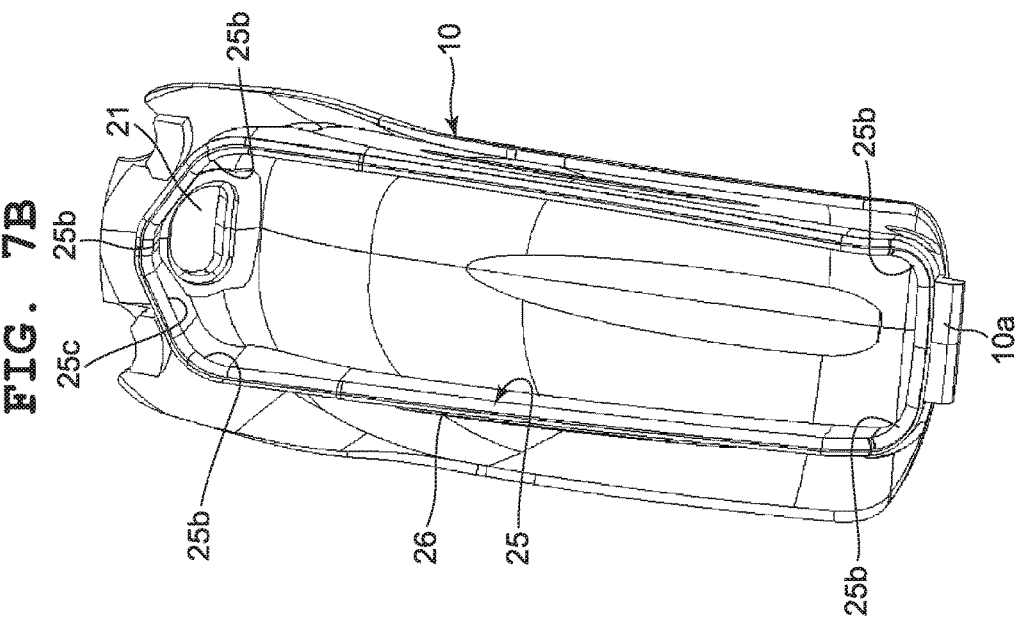
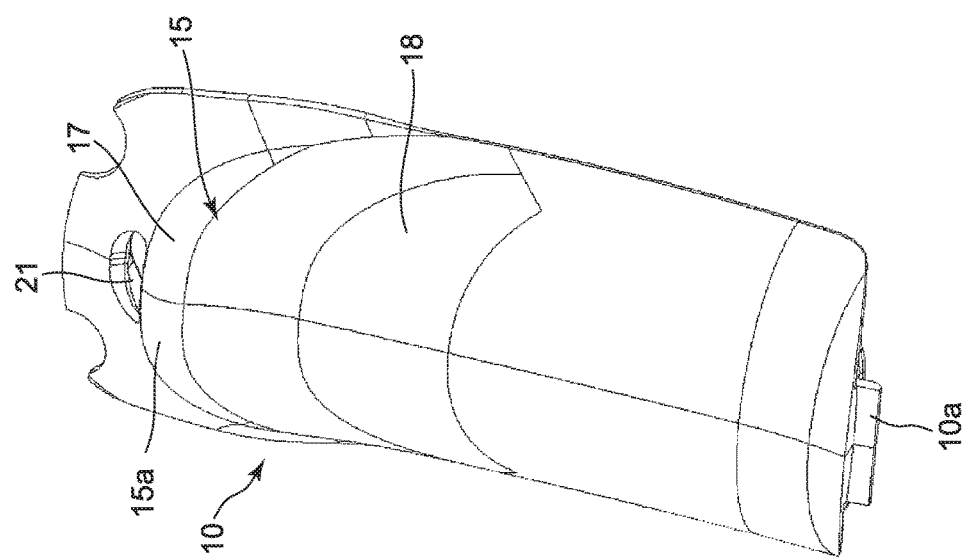

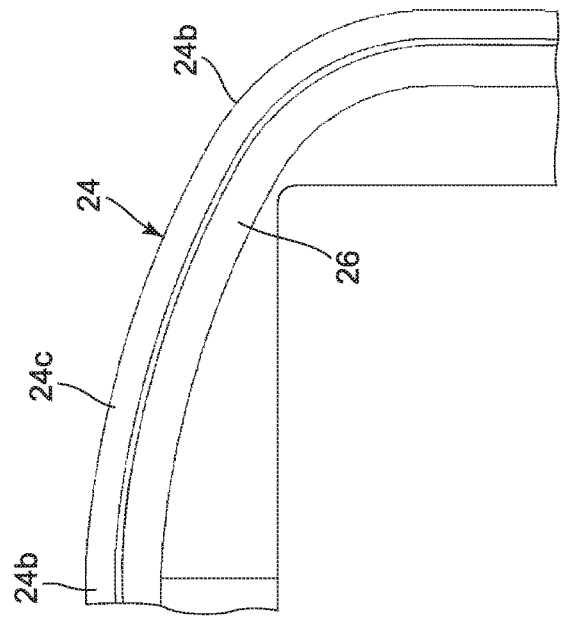
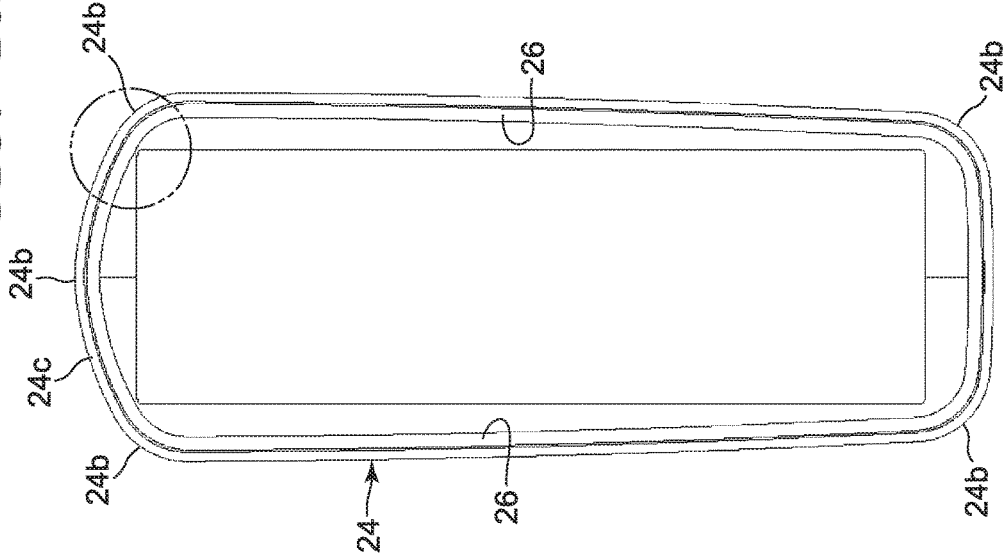

BATTERY COVER STRUCTURE AND PORTABLE TERMINAL

CROSS-REFERENCE TO RELATED APPLICATION

This application is based upon and claims the benefit of priority from the prior Japanese Patent Application No. 2017-175951 filed Sep. 13, 2017, the entire contents of which are incorporated herein by reference.

BACKGROUND OF THE INVENTION

1. Field of the Invention

The present invention relates to a battery cover structure for an electronic device such as a portable terminal and a portable terminal having this structure.

2. Description of the Related Art

A portable electronic device is known which has a structure where an opening of a battery accommodation section provided in a device case is openably and closably covered by a battery cover, as described in Japanese Patent Application Laid-Open (Kokai) Publication No. 2012-178317.

This type of portable electronic device has a battery cover structure where the battery cover includes an outer cover which covers the opening of the battery accommodation section, an inner cover provided on an inner surface of this outer cover, and a waterproof gasket provided on the outer periphery of this inner cover so as to come in pressure contact with the inner wall surface of the battery accommodation section.

SUMMARY OF THE INVENTION

In accordance with one embodiment, there is provided a battery cover structure comprising: a battery accommodation section which has a battery insertion/removal opening provided on one surface side of a housing; a battery cover which openably covers the battery insertion/removal opening; and a gasket which is fitted into a groove provided in a periphery of the battery cover or a periphery of the battery insertion/removal opening so as to hermetically seal the battery accommodation section by the battery cover, wherein lateral pressure to the gasket fitted into the groove is greater in corner areas of the gasket than in linear areas of the gasket.

In accordance with another embodiment, there is provided a portable terminal comprising: an accommodation section which has an opening provided on one surface side of a housing; a cover member which openably covers the opening; and a gasket which is fitted into a groove provided in a periphery of the cover member or a periphery of the opening so as to hermetically seal the accommodation section by the cover member, wherein lateral pressure to the gasket fitted into the groove is greater in corner areas of the gasket than in linear areas of the gasket.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 7A and FIG. 7B show the battery cover of the portable terminal shown in FIG. 4, of which FIG. 7A is a perspective view showing the rear surface side of the battery cover and FIG. 7B is a perspective view showing the inner surface side of the battery cover;

FIG. 8A and FIG. 8B show a state where a frame section of the battery cover shown in FIG. 5 is inserted into an inner frame in the battery accommodation section, in which FIG. 8A is an enlarged perspective view of a cross section of the frame section inserted into the inner frame and FIG. 8B is an enlarged perspective view of a cross section of the frame section when it is being inserted into the inner frame;

FIG. 10A and FIG. 10B show a state where a waterproof gasket comes in pressure contact with the inner peripheral surface of the inner frame of the battery accommodation section shown in FIG. 9, of which FIG. 10A is a rear view of that state and FIG. 10B is an enlarged view of a pressure contact state of the waterproof gasket in an arc portion at a corner area of the inner frame.

DETAILED DESCRIPTION OF THE PREFERRED EMBODIMENTS

An embodiment of a portable terminal to which the present invention has been applied will hereinafter be described with reference to FIG. 1 to FIG. 10B.

This portable terminal includes a device case 1 that is a terminal main body, as shown in FIG. 1 to FIG. 5. This device case 1 is formed to have a substantially rectangular shape elongated in a longitudinal direction (portrait orientation in FIG. 1).

This device case 1 is formed to have its substantially half on an upper side as a broad portion 1a, have the remaining half on a lower side as a narrow portion 1b, and have a substantially Japanese battledore shape as a whole, as shown in FIG. 1 to FIG. 5. That is, the broad portion 1a on the upper side is formed such that its length (width) in a lateral direction (landscape orientation in FIG. 1) orthogonal to its longitudinal direction is larger (wider) than the length (width) of the narrow section 1b on the lower side in the lateral direction (landscape orientation in FIG. 1).

Figure 1:
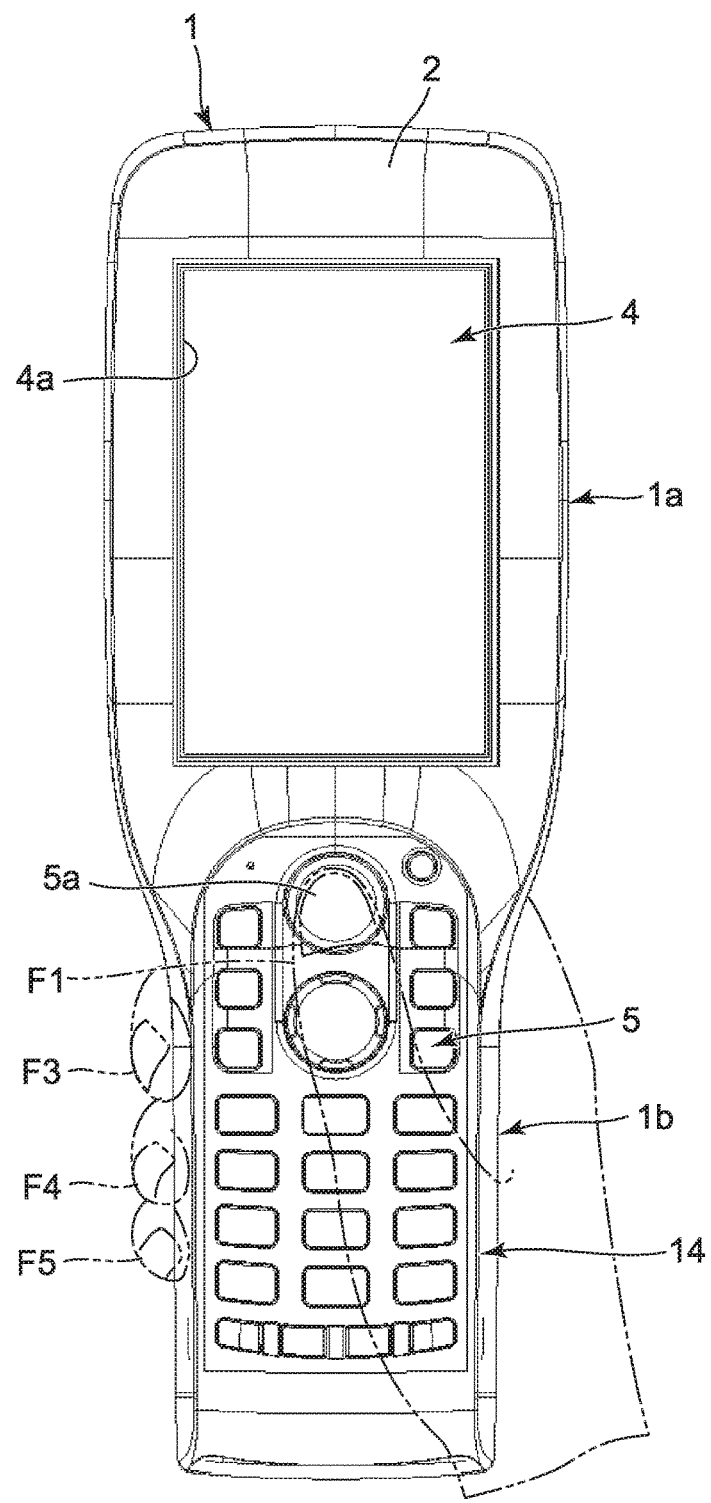
FIG. 1 is a front view of an embodiment in which the present invention has been applied to a portable terminal.
Figure 2:
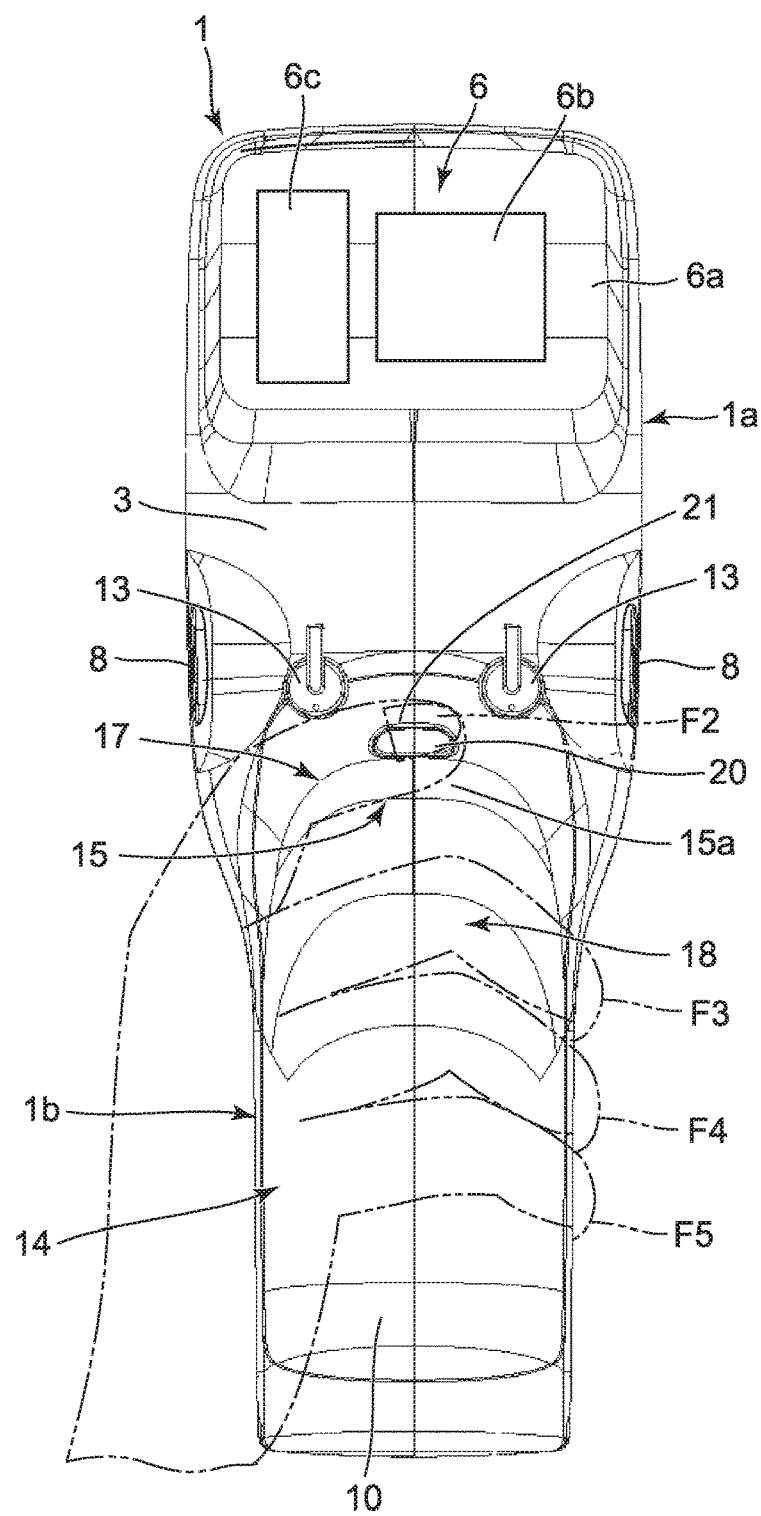
FIG. 2 is a rear view of the portable terminal shown in FIG. 1.
Figure 3:
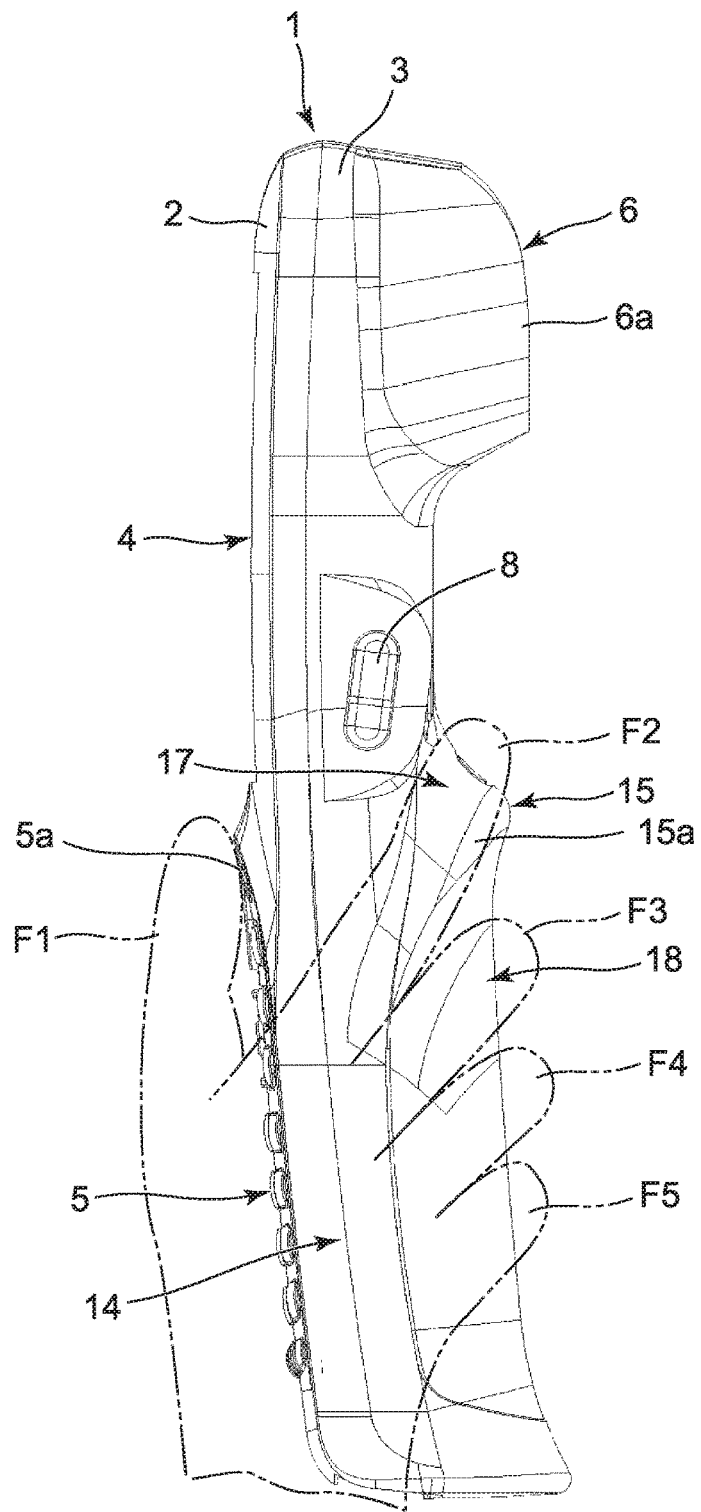
FIG. 3 is a left side view of the portable terminal shown in FIG. 2.

Also, this device case 1 is structured to have an upper case 2 and a lower case 3 and have modules (not shown) incorporated therein, as shown in FIG. 1 to FIG. 5. The upper case 2 is structured to be formed, as with the device case 1, in a substantially Japanese battledore shape having a broad portion on the upper side and a narrow portion on the lower side and have a side surface portion of its outer edge attached to the lower case 3, as shown in FIG. 1 and FIG. 3.

Figure 5:
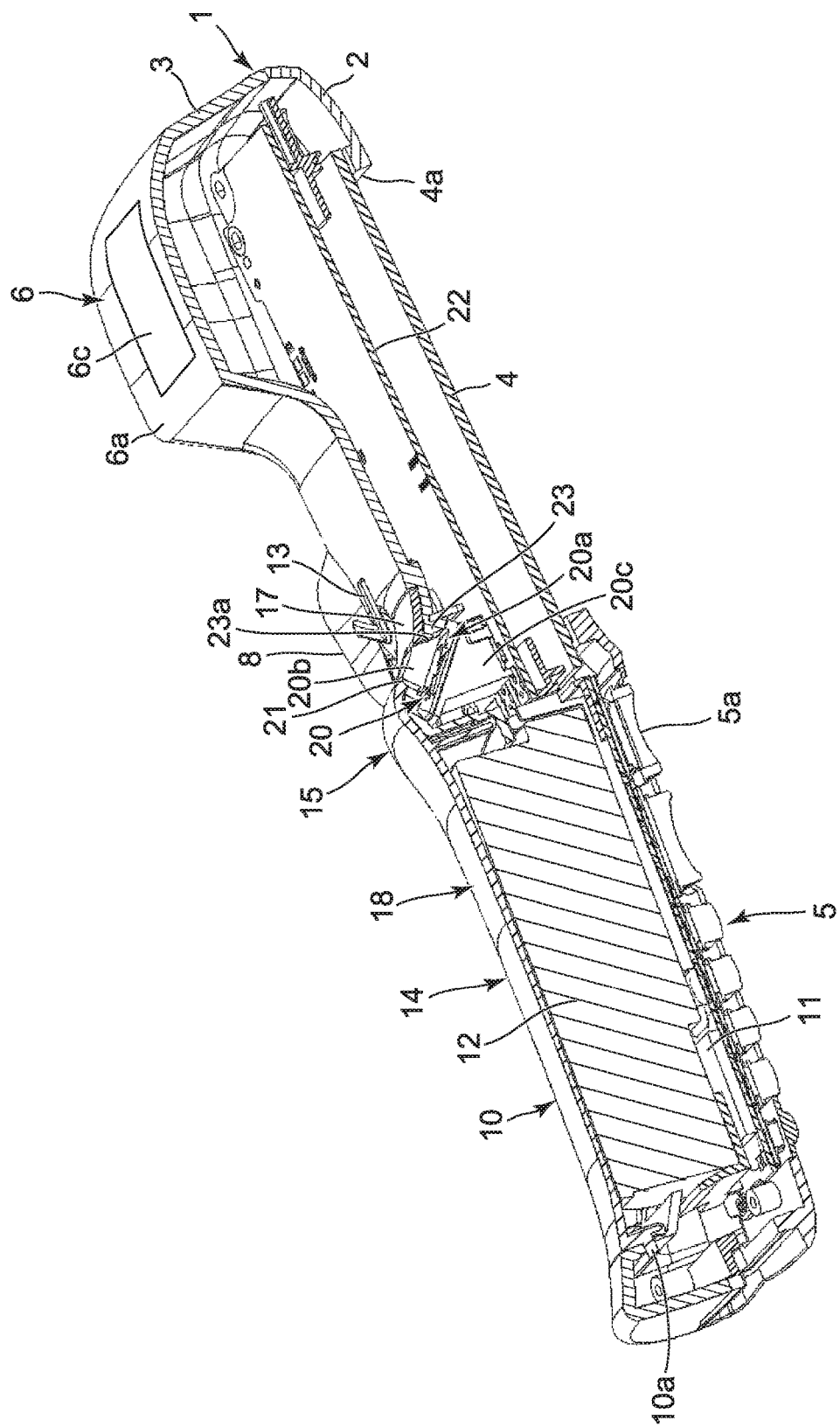
FIG. 5 is a perspective view showing a cross section of the portable terminal taken along line A-A in FIG. 4.
Figure 6:
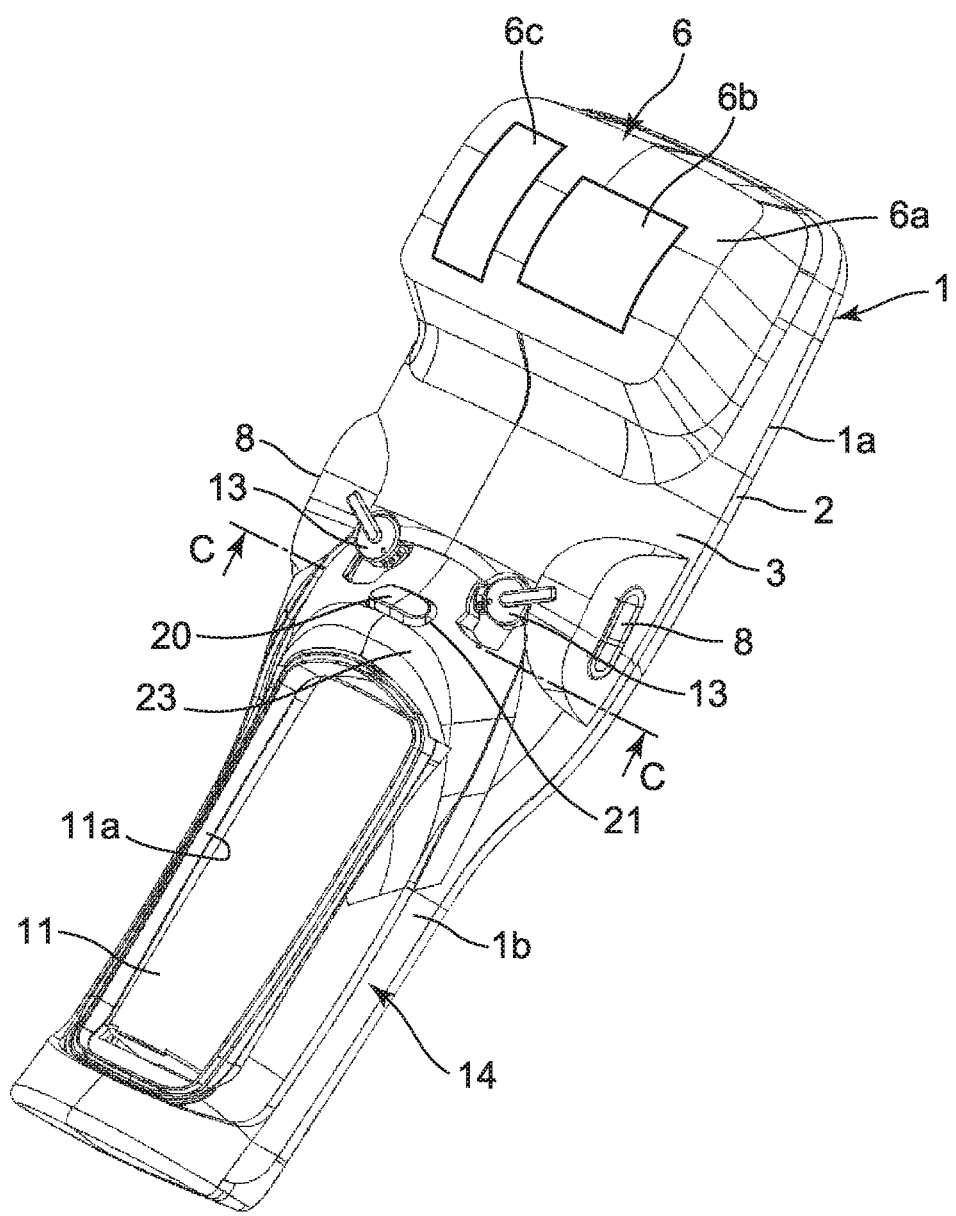
FIG. 6 is a perspective view showing the portable terminal shown in FIG. 4, in which a battery cover has been removed.

Also, on the broad portion on the upper side on the front surface that is the upper surface of the upper case 2, a display section 4 is provided over a substantially entire area, as shown in FIG. 1 and FIG. 5. Also, on the narrow portion on the lower side on the front surface of the upper case 2, a key operation section 5 is provided over a substantially entire area. The display section 4 is a display panel of a flat-surface type, such as a liquid-crystal display panel or EL (electroluminescence) display panel, and is formed to have a substantially rectangular shape.

This display section 4 is structured to be arranged in the upper case 2 so as to correspond to a display window section 4a provided on the front surface of the upper case 2, whereby information displayed on the display section 4 can be viewed from above the upper case 2 through the display window section 4a, as shown in FIG. 1 and FIG. 5. The key operation section 5 includes various keys required for the portable terminal, such as numeric keys, a cursor key, and function keys. In the present embodiment, the key operation section 5 has an upper surface trigger key 5a arranged on its upper middle area.

Figure 4:
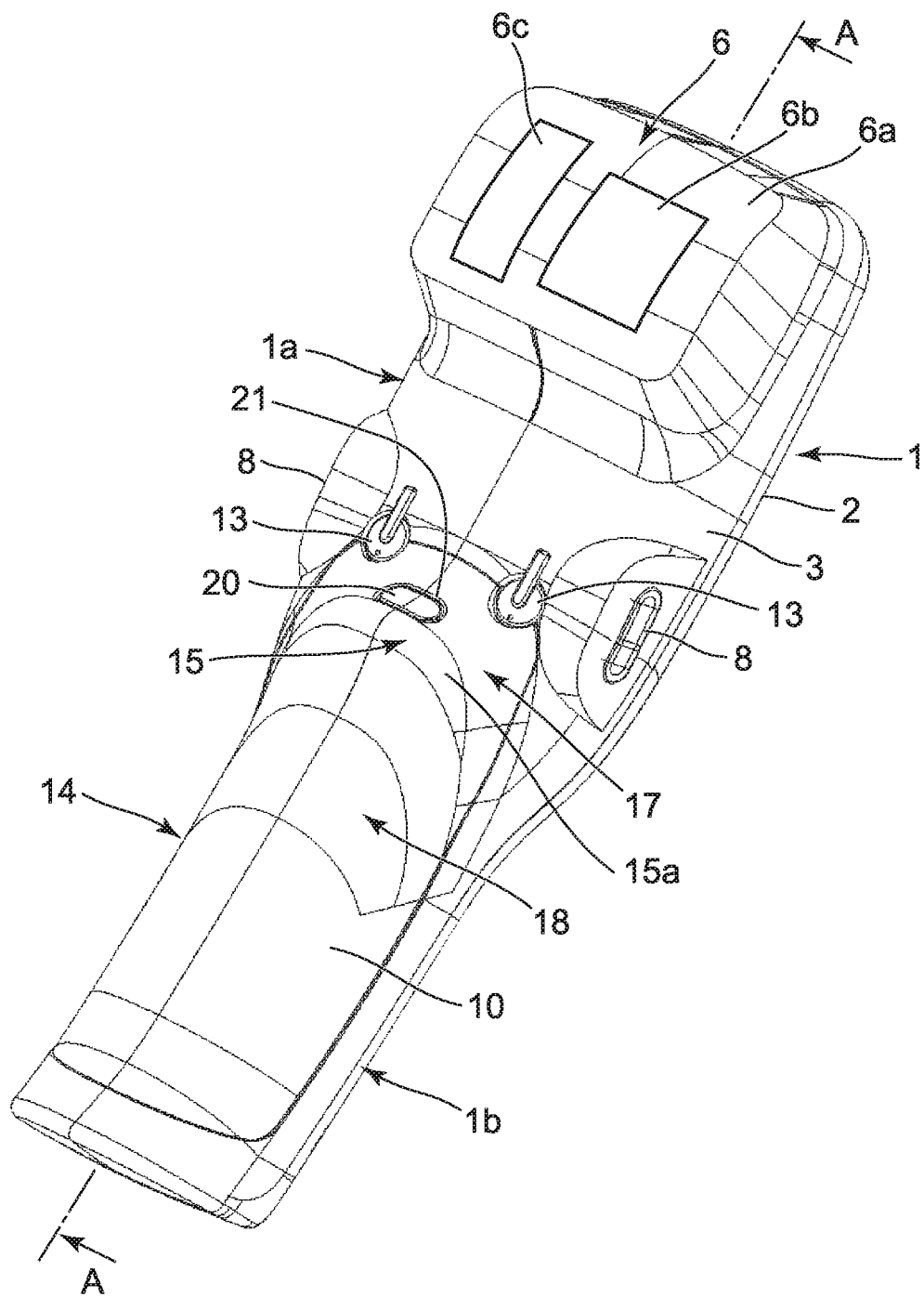
FIG. 4 is a rear perspective view of the portable terminal shown in FIG. 1.

The lower case 3 is structured to be formed, as with the upper case 2, in a substantially Japanese battledore shape having a broad portion on the upper side and a narrow portion on the lower side and have a side surface portion of its outer edge attached to the upper case 2, as shown in FIG. 2 to FIG. 4. On the rear surface that is the lower surface of the broad portion positioned on the upper side of this lower case 3, an optical reading section 6 is provided.

This optical reading section 6 includes a laser reading section and an imaging section (both are not shown), and these sections are stored in a read projection section 6a provided projecting in a box shape to the rear surface positioned on the upper side in the broad portion of the lower case 3, as shown in FIG. 2 to FIG. 5. In the present embodiment, the read projection section 6a is provided with a first window section 6b corresponding to the laser reading section and a second window section 6c corresponding to the imaging section.

The optical reading section 6 is structured such that the laser reading section emits a laser beam from the first window section 6b of the read projection section 6a to the outside of the device case 1 and receives a reflected light of the laser beam so as to read, for example, a barcode of an article, as shown in FIG. 2 to FIG. 5. Also, this optical reading section 6 is structured such that the imaging section captures, through the second window section 6c, an image of an article from which its barcode is to be read by the laser reading section.

Also, to substantially the midpoint of the device case 1 in the longitudinal direction (length direction), that is, on both sides of the broad portion 1a positioned on a boundary side between the broad portion 1a and the narrow portion 1b, side trigger keys 8 are provided, as shown in FIG. 1 to FIG. 5. The side trigger keys 8 and the upper surface trigger key 5a of the key operation section 5 are to cause a reading operation by the optical reading section 6 to be performed.

Furthermore, on the narrow portion 1b positioned on the lower side of this device case 1, a battery accommodation section 11 to be covered by a battery cover 10 is provided corresponding to the key operation section 5, as shown in FIG. 2 to FIG. 5. This battery accommodation section 11 is to accommodate a rechargeable battery 12, is provided inside the narrow portion 1b of the device case 1 so as to correspond to the key operation section 5 provided on the narrow portion 1b of the device case 1, and is open to the back surface side by a battery insertion/removal opening 11a provided in the rear surface of the device case 1.

Also, on the rear surface of the lower case 3 positioned between the battery accommodation section 11 and the optical reading section 6, a pair of attachment levers 13 is provided to removably attach the battery cover 10 which openably covers the battery accommodation section 11 to the lower case 3, as shown in FIG. 2 and FIG. 4. That is, the pair of attachment levers 13 is provided near the side trigger keys 8 provided on both sides of the device case 1. The pair of these attachment levers 13 is structured to be rotated to removably engage the edge on the upper side of the battery cover 10 with the rear surface of the lower case 3.

As a result, the battery cover 10 is structured to be attached to the rear surface of the lower case 3 by the edge on the upper side being engaged with the lower case 3 by the pair of the attachment levers 13, with it extending across a lower surface trigger key 20 described further below from the lower side of the battery accommodation section 11 and openably covering the battery insertion/removal opening 11a of the battery accommodation section 11, as shown in FIG. 2, FIG. 4 and FIG. 5. Also, a fulcrum projection portion 10a is provided at the end on the lower side of the battery cover 10. The battery cover 10 is structured to open and close the battery accommodation section 11 by rotating the fulcrum projection portion 10a as a fulcrum.

On the narrow portion 1b positioned on the lower side of the device case 1, a grip section 14 is provided so as to be gripped by one hand of the user, across the front surface of the device case 1 serving as a first surface and the rear surface positioned opposite thereto and serving as a second surface, as shown in FIG. 1 to FIG. 4. This grip section 14 is structured to be gripped by one hand of the user in a gripping style where the thumb F1 of one hand of the user is placed on the front surface of the device case 1 and the rear surface of the device case 1 is held by other fingers F2 to F5 extended from the side of the device case 1.

That is, this grip section 14 is constituted by the narrow portion 1b of the device case 1 including the narrow portion of the upper case 2 and the narrow portion of the lower case 3, and the battery cover 10 of the lower case 3, as shown in FIG. 1 to FIG. 4. In the present embodiment, each of sides of the narrow portion of the upper case 2 and the narrow portion of the lower case 3 in the grip section 14 is formed in an arc-shaped curved surface which makes the hand of the user gripping the grip section 14 in the above-described gripping style naturally curved. Also, the battery cover 10 of the lower case 3 is formed in a curved shape projecting so as to be mildly curved from both sides of the lower case 3 toward the rear surface side.

As a result, the grip section 14 has a shape by which the other fingers F2 to F5 are naturally flexed and placed around the rear surface of the device case 1, in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

That is, the grip section 14 is formed in a shape that can be easily gripped by one hand irrespective of the size of the hand of the user, by the gripping hand of the user fitting thereto when the user holds the device case 1 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

Also, in this grip section 14, the battery cover 10 positioned on the rear surface is provided with a raised portion 15 as shown in FIG. 2 to FIG. 5. The raised portion 15 is raised to have a bulging shape between the index finger F2 and the middle finger F3 of the gripping hand of the user when the user holds the device case 1 by one hand in the gripping style where the user places the thumb F1 on the front surface of the device case 1 and holds the rear surface of the device case 1 by the other fingers F2 to F5 extended from the side of the device case 1.

Also, the raised portion 15 has a V-shaped vertex portion 15a positioned between the index finger F2 and the middle finger F3 of the gripping hand of the user when the user holds the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 2 to FIG. 5. This vertex portion 15a is formed to be positioned between the index finger F2 and the middle finger F3 of the gripping hand of the user so as to be contiguous in a curved shape along a bent shape of the index finger F2 and the middle finger F3.

That is, this vertex portion 15a is formed so as to be contiguous in a curved shape along the bent shape of the index finger F2 and the middle finger F3 in a lateral direction orthogonal to the length direction of the device case 1 so that a contiguous middle portion in the lateral direction projects most toward the rear surface side of the device case 1 and the projection length gradually decreases from the middle portion in the lateral direction toward the both sides in the lateral direction, as shown in FIG. 2 to FIG. 5. Also, this raised portion 15 includes a first finger rest area 17 as one tail of the vertex portion 15a and a second finger rest area 18 as the other tail of the vertex portion 15a.

The first finger rest area 17 is a sloped surface onto which the index finger F2 is pressed when the user grips the grip section 14 in the above-described gripping style, and is formed as a steep sloped surface from the upper side of the battery cover 10 toward the vertex portion 15a, as shown in FIG. 2 to FIG. 5. The second finger rest area 18 is a sloped surface onto which the middle finger F3 to the small finger F5 are pressed when the user grips the grip section 14 in the above-described gripping style, and is formed as a sloped surface mildly sloped from the vertex portion 15a toward the lower side of the battery cover 10.

That is, the first finger rest area 17 is formed as a sloped surface onto which the pulp of the index finger F2 of the hand of the user gripping the grip section 14 is arranged while being pressed toward the lower side of the battery cover 10 in the longitudinal direction (length direction), that is, the hand of the user gripping the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

This first finger rest area 17 is formed as a sloped surface rising from an upper portion on the upper side of the battery cover 10 toward the vertex portion 15a at a steep angle, as shown in FIG. 2 to FIG. 5. Also, this first finger rest area 17 is curved in an arc shape corresponding to the bent state of the index finger F2 along the vertex portion 15a contiguous in the lateral direction orthogonal to the longitudinal direction (length direction) of the device case 1.

Accordingly, the raised portion 15 is structured such that the pulp of the index finger F2 of the user is pressed onto the first finger rest area 17 with the index finger F2 being bent along the curve of the first finger rest area 17 and, in this state, the index finger F2 pulls the first finger rest area 17 toward the lower side of the device case 1 in the longitudinal direction, that is, toward the hand of the user gripping the grip section 14, when the user grips the grip section 14 in the gripping style where the user places the thumb F1 on the key operation section 5 and holds the rear surface of the device case 1 by the other fingers F2 to F5 extended from the side of the device case 1, as shown in FIG. 2 to FIG. 5.

On the other hand, the second finger rest area 18 is formed as a curved surface such that the pulp of each of the other fingers F3 to F5 of the hand of the user gripping the grip section 14 causes the battery cover 10 of the grip section 14 to be pressed toward the device case 1 and the middle finger F3 to the small finger F5 of the user are naturally flexed with them being aligned, when the user grips the grip section 14 in the gripping style where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 5.

That is, this second finger rest area 18 is formed as a curved surface mildly sloped from the vertex portion 15a toward the lower side of the battery cover 10, as shown in FIG. 2 to FIG. 4. As a result, this second finger rest area 18 is formed in a mild curved shape with a convex toward the rear surface side of the battery cover 10 so that the fingers F3 to F5 other than the index finger F2 are aligned and naturally flexed, when the user grips the grip section 14 in the gripping style where the user places the thumb F1 on the key operation section 5 and holds the rear surface of the device case 1 by the other fingers F2 to F5 extended from the side of the device case 1.

Furthermore, this device case 1 is formed such that the grip section 14 has a bilaterally symmetrical shape with respect to the center position of the device case 1 in the lateral direction, as shown in FIG. 1 to FIG. 5. As a result, this device case 1 is structured such that the user can grip the grip section 14 by the right hand or the left hand in a similar manner.

The finger rest area 17 of the raised portion 15 provided on the upper side of the battery cover 10 is structured be arranged and hold on the rear surface of the cover holding section 23 provided to the lower case 3, as shown in FIG. 5. That is, this cover holding section 23 is formed to be raised in a shape substantially the same as that of the first finger rest area 17. Inside this cover holding section 23, the lower surface trigger key 20 is provided corresponding to the first finger rest area 17.

This lower surface trigger key 20 is to cause a reading operation by the optical reading section 6 to be performed, as shown in FIG. 5. The lower surface trigger key 20 includes a switch main body 20a, an operation button 20b, and a switch holding section 20c.

That is, the switch holding section 20c of the lower surface trigger key 20 is attached to the inner surface of the cover holding section 23 with it being arranged in the cover holding section 23 corresponding to the first finger rest area 17, as shown in FIG. 5. The switch main body 20a is structured so as to be held in the switch holding section 20c with it being sloped in parallel to the sloped surface of the first finger rest area 17 and, in this state, be electrically connected to a circuit board 22 provided in the broad portion 1*a* of the device case 1.

The operation button 20*b* is a pressing target portion as shown in FIG. 5, is arranged in the switch main body 20*a* with it being sloped in parallel to the sloped surface of the first finger rest area 17, and is arranged in a button insertion hole 21 provided in the first finger rest area 17 of the battery cover 10 through a button hole 23*a* provided in the cover holding section 23. As a result, the operation button 20*b* is structured to cause the switch main body 20*a* to perform an ON operation when pressed from outside the device case 1. In the present embodiment, the operation button 20*b* is arranged in the button insertion hole 21 of the first finger rest area 17 without projecting to the outside of the device case 1.

Accordingly, the lower surface trigger key 20 is structured such that the operation button 20*b* is not pressed by the pulp of the index finger F2 and the switch main body 20*a* does not perform an ON operation even if the pulp of the index finger F2 of the hand of the user gripping the grip section 14 is pressed onto the first finger rest area 17 along its curve with the index finger F2 being in a bent shape and, in this state, the raised portion 15 is pulled toward the lower side of the device case 1, that is, toward the hand of the user gripping the grip section 14, when the user grips the grip section 14 of the device case 1 by one hand, as shown in FIG. 5.

Also, the lower surface trigger key 20 is structured such that, in the pressing state in which the user grips the grip section 14 of the device case 1 by one hand and presses the pulp of the index finger F2 of the hand gripping the grip section 14 along the curve of the first finger rest area 17 with the index finger F2 being in a bent shape, when the pulp of the index finger F2 pulls the raised portion 15 toward the lower side of the device case 1, that is, toward the hand of the user gripping the grip section 14, and is strongly pushed into the button insertion hole 21, the operation button 20*b* is pushed by the pulp of the index finger F2 to cause the switch main body 20*a* to perform an ON operation, as shown in FIG. 5.

On the other hand, the outer shape of the battery cover 10 is formed larger than the battery insertion/removal opening 11*a* of the battery accommodation section 11, as shown in FIG. 5 to FIG. 8. This battery cover 10 is structured such that it is opened and closed with the fulcrum projection portion 10*a* provided at the end of the lower side as a fulcrum. That is, the battery cover 10 is structured to cover the battery insertion/removal opening 11*a* of the battery accommodation section 11 by being rotated with the fulcrum projection portion 10*a* on the lower side being inserted into the lower side in the battery accommodation section 11 and serving as a fulcrum.

Figure 8A:
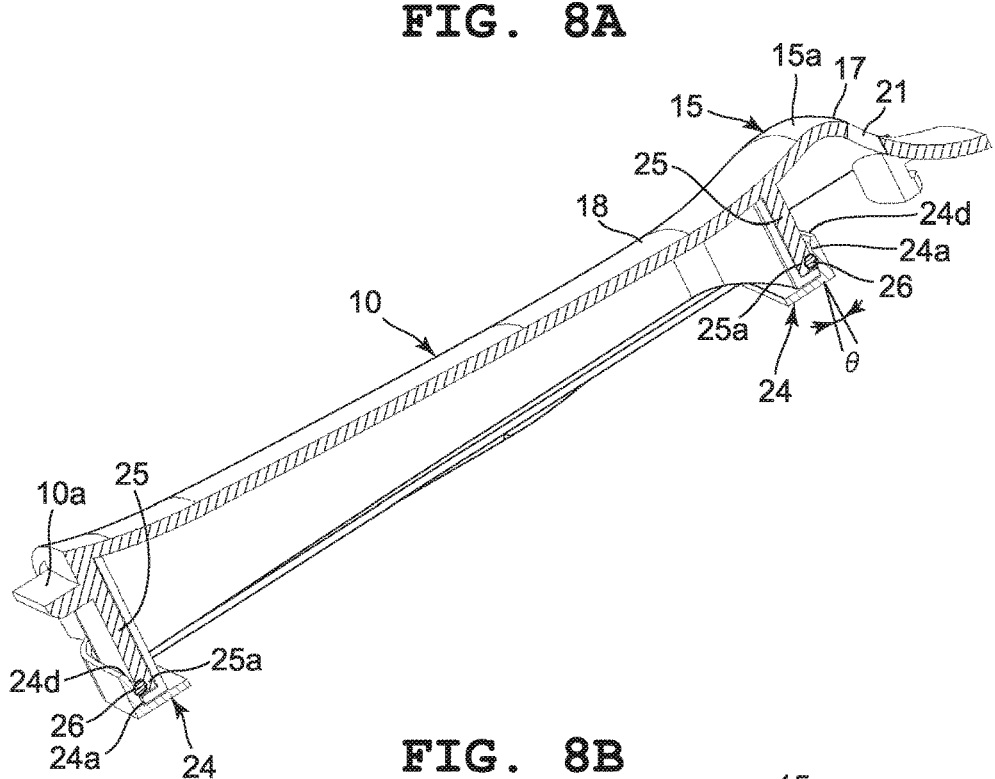
Figure 8B:
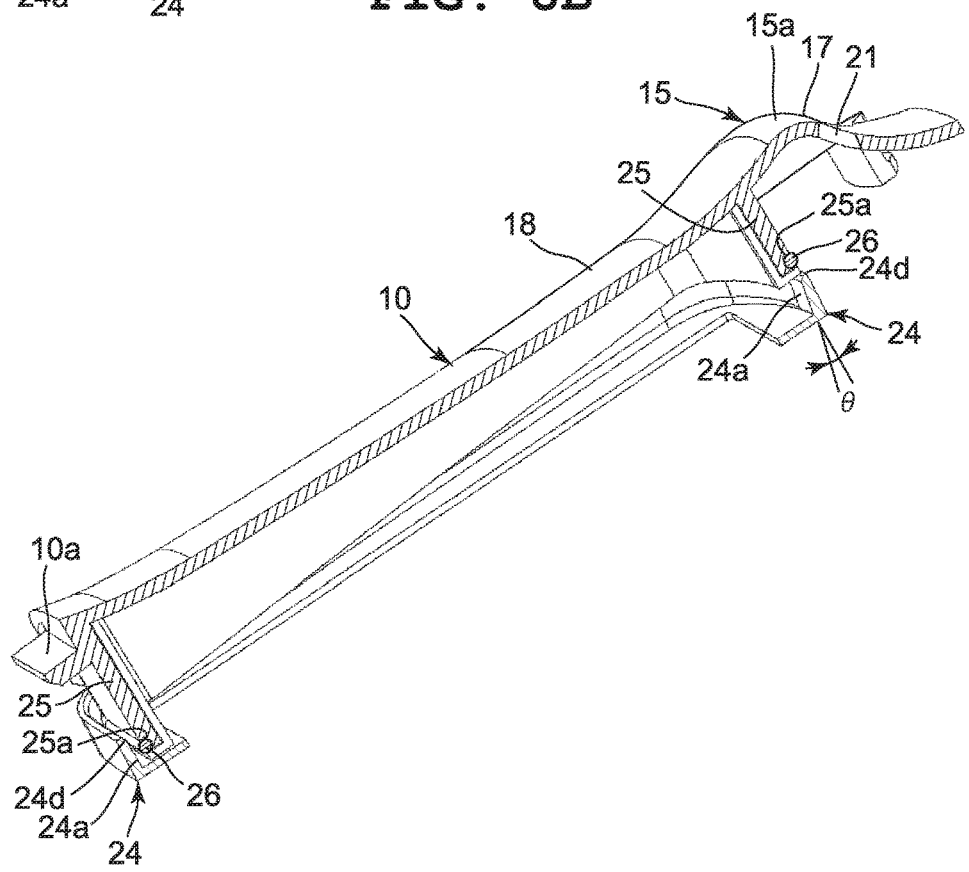
Figure 9:
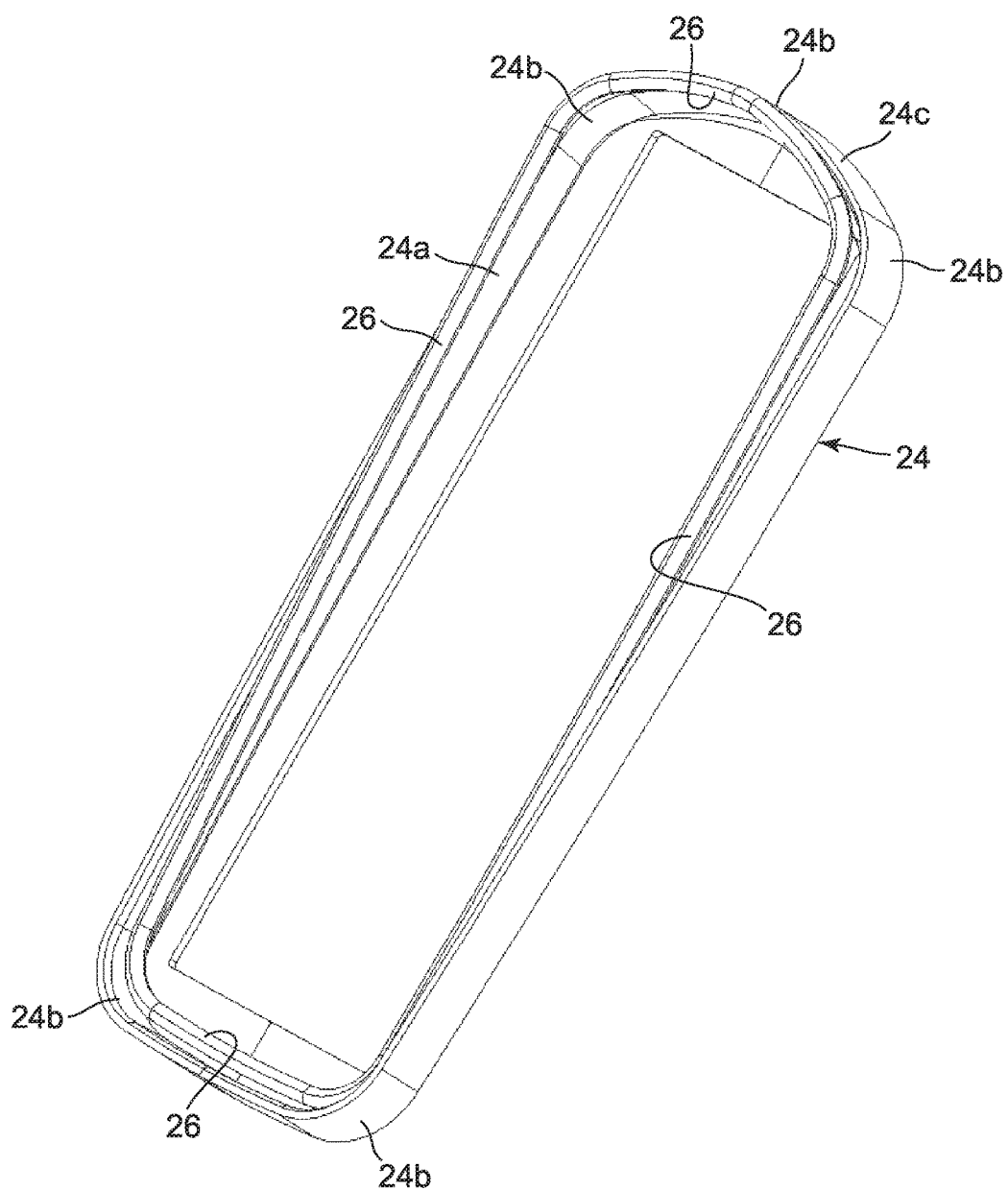
FIG. 9 is an enlarged perspective view of the inner frame of the battery accommodation section in the portable terminal shown in FIG. 5.

Also, inside the battery accommodation section 11, an inner frame 24 is provided along the periphery of the battery insertion/removal opening 11*a* of the battery accommodation section 11, as shown in FIG. 8A, FIG. 8B and FIG. 9. On the inner surface of the battery cover 10, a frame section 25 to be inserted into the inner frame 24 of the battery accommodation section 11 is provided along the inner periphery of the inner frame 24, as shown in FIG. 7B, FIG. 8A and FIG. 8B. On a lower portion of the outer peripheral surface of this frame section 25, a groove portion 25*a* where a waterproof gasket 26 is fitted is provided over the entire perimeter.

The waterproof gasket 26 is made of an elastic material such as rubber and has a ring shape, as shown in FIG. 7B, FIG. 8A and FIG. 8B. That is, the waterproof gasket 26 is structured to have a circular cross section and come in pressure contact with the inner wall surface 24*a* of the inner frame 24 of the battery accommodation section 11 when the battery cover 10 covers the battery accommodation section 11 and the frame section 25 is inserted into the inner frame 24 of the battery accommodation section 11.

The groove portion 25*a* in the frame section 25 of the battery cover 10 is formed such that its inner length (width) in the plane direction of the battery cover 10 is shorter than the diameter of the cross-sectional shape of the waterproof gasket 26, as shown in FIG. 8A and FIG. 8B. Accordingly, the waterproof gasket 26 is structured so as to partially project to the outside from the inside of the groove portion 25*a* of the frame section 25 when it is inserted into the groove portion 25*a* of the frame section 25.

Also, the inner length (width) of the groove portion 25*a* in the plane direction of the battery cover 10 is formed such that each corner area that is a corner portion of the groove portion 25*a* is narrower than each linear area that is a side portion of the groove portion 25*a*, as shown in FIG. 8A and FIG. 8B. Accordingly, a projection length of the waterproof gasket 26 from the inside of the groove portion 25*a* to the outside in each corner area is larger than that in each linear area which is a side portion. As a result, lateral pressure that is applied when a portion of the waterproof gasket 26 in each corner area comes in pressure contact with the inner wall surface 24*a* of the inner frame 24 of the battery accommodation section 11 is greater than the lateral pressure that is applied when a portion of the waterproof gasket 26 in each linear area comes in pressure contact with the inner wall surface 24*a*.

Also, the frame section 25 of the battery cover 10 and the inner frame 24 of the battery accommodation section 11 are formed in a folding-fan shape where length in a width direction orthogonal to a longitudinal direction extending away from the fulcrum projection portion 10*a* of the battery cover 10 gradually increases from the fulcrum projection portion 10*a*, as shown in FIG. 7B and FIG. 9. Also, the upper side of the frame section 25 of the battery cover 10 located away from the fulcrum projection portion 10*a* of the battery cover 10 is constituted by a curved portion 25*c* mildly projecting toward a direction away from the fulcrum projection portion 10*a*, and the upper side of the inner frame 24 of the battery accommodation section 11 located away from the fulcrum projection portion 10*a* of the battery cover 10 is constituted by a curved portion 24*c* mildly projecting toward a direction away from the fulcrum projection portion 10*a*.

As a result, the frame section 25 of the battery cover 10 and the inner frame 24 of the battery accommodation section 11 have a substantially pentagonal shape as a whole, with the frame section 25 being inserted into the inner frame 24, as shown in FIG. 7B and FIG. 9. Accordingly, the frame section 25 of the battery cover 10 and the inner frame 24 of the battery accommodation section 11 each have corner areas having obtuse angles. In the present embodiment, each corner area of the inner frame 24 of the battery accommodation section 11 is formed in an arc portion 24*b*, and each corner area of the frame section 25 of the battery cover 10 corresponding thereto is formed in an arc portion 25*b*. The arc portion 24*b* and the arc portion 25*b* have a same curvature.

As a result, when the frame section 25 of the battery cover 10 is inserted into the inner frame 24 of the battery accommodation section 11 to come in pressure contact with the inner wall surface 24*a* of the inner frame 24, the expansion of a portion of the waterproof gasket 26 between each arc portion 24*b* and each arc portion 25*b* in each corner area between the frame section 25 of the battery cover 10 and the inner frame 24 of the battery accommodation section 11 is reduced, as shown in FIG. 7B, FIG. 9, FIG. 10A and FIG. 10B.

Also, a structure has been achieved in which lateral pressure that is applied when each portion of the waterproof gasket 26 at each arc portion 25*b* in the corner areas of the frame section 25 of the battery cover 10 comes in pressure contact with each arc portion 24*b* in the corner areas of the inner frame 24 of the battery accommodation section 11 is greater than the lateral pressure that is applied to each portion of the waterproof gasket 26 in areas other than each arc portion 25*b* in the corner areas of the frame section 25 of the battery cover 10, that is, the lateral pressure that is applied to each portion of the waterproof gasket 26 in each linear area which is a side portion of the frame section 25, as shown in FIG. 7B, FIG. 9, FIG. 10A and FIG. 10B.

That is, a structure has been achieved in which the compression amount of a portion of the waterproof gasket 26 between each arc portion 25*b* in the corner areas of the frame section 25 of the battery cover 10 and each arc portion 24*b* in the corner areas of the inner frame 24 of the battery accommodation section 11 is larger than the compression amount of a portion of the waterproof gasket 26 between each linear area that is a side portion of the frame section 25 of the battery cover 10 and each linear area that is a side portion of the inner frame 24 of the battery accommodation section 11, as shown in FIG. 10A and FIG. 10B.

For example, the compression amount of the portion between each arc portion 25*b* in the corner areas of the frame section 25 of the battery cover 10 and each arc portion 24*b* in the corner areas of the inner frame 24 of the battery accommodation section 11 is approximately 0.2 mm, and the compression amount of the portion between each linear area that is a side portion of the frame section 25 of the battery cover 10 and each linear area that is a side portion of the inner frame 24 of the battery accommodation section 11 is 0.15 mm.

Accordingly, when the frame section 25 of the battery cover 10 is inserted into the inner frame 24 of the battery accommodation section 11, the lateral pressure to each portion of the waterproof gasket 26 between each arc portion 25*b* of the frame section 25 of the battery cover 10 and each arc portion 24*b* the inner frame 24 of the battery accommodation section 11 is greater than the lateral pressure to each portion of the waterproof gasket 26 in areas other than the arc portions 25*b* and 24*b*, that is, the lateral pressure to the waterproof gasket 26 in each linear area that is a side portion, as shown in FIG. 10A and FIG. 10B. As a result, the durability of the waterproof gasket 26 is enhanced, and waterproofness by the waterproof gasket 26 is ensured for a long period of time.

Also, the inner wall surface 24*a* of the inner frame 24 of the battery accommodation section 11 is provided with a draft angle θ gradually increasing from the bottom side of the inner frame 24 toward the battery insertion/removal opening 11*a* side, as shown in FIG. 8A and FIG. 8B. This draft angle θ is formed such that the inclination angle on the curved portion 24*c* side that is the upper side of the inner frame 24 positioned away from the fulcrum projection portion 10*a* is larger than the inclination angle on the fulcrum projection portion 10*a* side of the battery cover 10. For example, the draft angle θ on the fulcrum projection portion 10*a* side of the battery cover 10 is approximately 3 degrees, and the draft angle θ at the curved portion 24*c* on the upper side of the inner frame 24 positioned away from the fulcrum projection portion 10*a* is approximately 7 degrees.

As a result, when the battery cover 10 is rotated with the fulcrum projection portion 10*a* as a fulcrum and the frame section 25 of the battery cover 10 is inserted into the inner frame 24 of the battery accommodation section 11, the friction resistance of the waterproof gasket 26 with respect to the inner wall surface 24*a* of the inner frame 24 gradually decreases with distance from the fulcrum projection portion 10*a* of the battery cover 10 due to the change of the draft angle θ described above, as shown in FIG. 7A to FIG. 10B.

Also, an edge of the inner wall surface 24*a* of the inner frame 24 of the battery accommodation section 11 is provided with a chamfered portion 24*d*, as shown in FIG. 8A and FIG. 8B. This chamfered portion 24*d* is provided to favorably guide and insert the waterproof gasket 26 projecting from the inside of the groove portion 25*a* of the frame section 25 to the outside when the frame section 25 of the battery cover 10 is inserted into the inner frame 24 of the battery accommodation section 11.

Next, the mechanism of this portable terminal is described.

To use this portable terminal, the user first attaches the battery cover 10 to the rear surface of the device case 1 so as to cover the battery insertion/removal opening 11*a* of the battery accommodation section 11 provided to the narrow portion 1*b* of the device case 1. Here, the fulcrum projection portion 10*a* on the lower side of the battery cover 10 is attached to an inner peripheral portion of the battery accommodation section 11 on the lower side, and the battery cover 10 is rotated with the fulcrum projection portion 10*a* of the attached battery cover 10 as a fulcrum.

Then, the frame section 25 of the battery cover 10 is gradually inserted into the inner frame 24 of the battery accommodation section 11 from the lower side toward the upper side of the fulcrum projection portion 10*a* side. Here, the frame section 25 of the battery cover 10 is inserted into the inner frame 24 of the battery accommodation section 11 while the waterproof gasket 26 provided inside the groove portion 25*a* of the frame section 25 and projecting to the outside gradually comes in pressure contact with the inner wall surface 24*a* of the inner frame 24 of the battery accommodation section 11 toward the upper side located away from the lower side on the fulcrum projection portion 10*a* side.

Here, the frame section 25 of the battery cover 10 and the inner frame 24 of the battery accommodation section 11 have a substantially pentagonal shape, each corner area of the frame section 25 of the battery cover 10 has the arc portion 25*b* and each corner area of the inner frame 24 of the battery accommodation section 11 has the arc portion 24*b*. Accordingly, the expansion of the portion of the waterproof gasket 26 in each corner area between the frame section 25 of the battery cover 10 and the inner frame 24 of the battery accommodation section 11 is reduced. As a result, the reduction of the cross-sectional shape of the waterproof gasket 26 at the position between the respective corner areas can be decreased.

Also, the structure has been achieved in which lateral pressure that is applied when a portion of the waterproof gasket 26 at each arc portion 25*b* in the corner areas of the frame section 25 of the battery cover 10 comes in pressure contact with each arc portion 24*b* in the corner areas of the inner frame 24 of the battery accommodation section 11 is greater than the lateral pressure that is applied when each portion of the waterproof gasket 26 in the areas other than each arc portion 25b in the corner areas of the frame section 25 of the battery cover 10, that is, the lateral pressure that is applied when each portion of the waterproof gasket 26 in each linear area that is a side portion of the frame section 25 comes in pressure contact with the inner frame 24 of the battery accommodation section 11. As a result, the waterproof gasket 26 almost equally comes in pressure contact with the entire area of the inner frame 24. Therefore, its durability is enhanced, so that waterproofness is ensured for a long period of time.

That is, the structure has been achieved in which the compression amount of each portion of the waterproof gasket 26 between each arc portion 25b in the corner areas of the frame section 25 of the battery cover 10 and each arc portion 24b in the corner areas of the inner frame 24 of the battery accommodation section 11 is larger than the compression amount of each portion of the waterproof gasket between each side of the frame section 25 of the battery cover 10 and each side of the inner frame 24 of the battery accommodation section 11, whereby the entire peripheral area of the waterproof gasket 26 is almost equally compressed. Therefore, the durability is enhanced, so that waterproofness is ensured for a long period of time.

Also, when the frame section 25 of the battery cover 10 is to be inserted into the inner frame 24 of the battery accommodation section 11, the battery cover 10 is rotated with the fulcrum projection portion 10a on the lower side as a fulcrum, and the frame section 25 of the battery cover 10 is thereby gradually inserted into the inner frame 24 of the battery accommodation section 11 from the lower side toward the upper side of the fulcrum projection portion 10a side. As a result of this structure, the frame section 25 of the battery cover 10 is smoothly and favorably inserted into the inner frame 24 of the battery accommodation section 11.

Also, the frame section 25 of the battery cover 10 and the inner frame 24 of the battery accommodation section 11 are formed in the folding-fan shape where the length in the width direction orthogonal to the longitudinal direction extending away from the fulcrum projection portion 10a of the battery cover 10 gradually increases with distance from the fulcrum projection portion 10a. Therefore, by the battery cover 10 being rotated centering on the fulcrum projection portion 10a on the lower side of the battery cover 10, the waterproof gasket 26 gradually comes in pressure contact with the inner wall surface 24a of the inner frame 24 from the lower side toward the upper side of the fulcrum projection portion 10a side corresponding to the rotation of the battery cover 10 when the frame section 25 of the battery cover 10 is inserted into the inner frame 24 of the battery accommodation section 11.

Also, the upper side of the frame section 25 of the battery cover 10 located away from the fulcrum projection portion 10a of the battery cover 10 is constituted by the curved portion 25c mildly projecting in the direction away from the fulcrum projection portion 10a, and the upper side of the inner frame 24 of the battery accommodation section 11 located away from the fulcrum projection portion 10a of the battery cover 10 is constituted by the curved portion 24c mildly projecting in the direction away from the fulcrum projection portion 10a. Therefore, at the curved portion 25c of the frame section 25 positioned in the direction away from the fulcrum projection portion 10a, the waterproof gasket 26 gradually comes in pressure contact with the inner surface of the corresponding curved portion 24c of the inner frame 24 along its curve.

Also, the inner wall surface 24a of the inner frame 24 of the battery accommodation section 11 is provided with the draft angle θ gradually widened from its bottom side toward the battery insertion/removal opening 11a side. As a result, when the frame section 25 of the battery cover 10 is to be inserted into the inner frame 24 of the battery accommodation section 11, the friction resistance of the waterproof gasket 26 with respect to the inner wall surface 24a of the inner frame 24 can be reduced by the presence of the draft angle θ, whereby twisting and cutting of the waterproof gasket 26 can be prevented.

Furthermore, the draft angle θ provided to the inner wall surface 24a of the inner frame 24 of the battery accommodation section 11 has a small inclination angle on the fulcrum projection portion 10a side of the battery cover 10 and a large inclination angle of the curved portion 24c on the upper side which is distant from the fulcrum projection portion 10a. As a result, when the frame section 25 of the battery cover 10 is to be inserted into the inner frame 24 of the battery accommodation section 11, the friction resistance of the waterproof gasket 26 with respect to the curved portion 24c of the inner frame 24 located away from the fulcrum projection portion 10a of the battery cover 10 is reduced.

As a result, twisting and cutting of the waterproof gasket 26 can be prevented, and the frame section 25 of the battery cover 10 can be favorably inserted into the inner frame 24 of the battery accommodation section 11. Furthermore, by the chamfered portion 24d being provided to the edge portion of the inner wall surface 24a of the inner frame 24 of the battery accommodation section 11, when the frame section 25 of the battery cover 10 is to be inserted into the inner frame 24 of the battery accommodation section 11, the waterproof gasket 26 provided on the outer periphery of the frame section 25 is guided by the chamfered portion 24d and thereby smoothly and easily inserted into the inner frame 24.

Accordingly, in the battery cover 10, the extended portion of the first finger rest area 17 is arranged on the cover holding section 23 of the lower case 3, and covers the battery insertion/removal opening 11a of the battery accommodation section 11 with waterproofness being ensured by the waterproof gasket 26. Here, the button insertion hole 21 provided on the battery cover 10 corresponds to the button hole 23a of the cover holding section 23, and the operation button 20b of the lower surface trigger key 20 is inserted through this button hole 23a into the button insertion hole 21 provided in the first finger rest area 17 of the battery cover 10. Here, the operation button 20b is arranged inside the button insertion hole 21 of the first finger rest area 17 without projecting outside the device case 1.

Also, here, the edge of the upper side of the battery cover 10 corresponds to the pair of attachment levers 13 provided on the rear surface of the lower case 3. Accordingly, by the user rotating the pair of these attachment levers 13, the edge of the upper side of the battery cover 10 is pressed onto and engaged with the rear surface of the lower case 3 by the pair of attachment levers 13. As a result, the battery cover 10 covers the battery accommodation section 11 across the lower surface trigger key 20.

To use this portable terminal, the user holds the device case 1 by gripping the grip section 14 at the position of the battery cover 10 by one hand. That is, the user grips the grip section 14 by one hand in the gripping style where the user places the thumb F1 on the key operation section 5 so as to operate the key operation section 5 by the thumb F1 and holds the rear surface of the device case 1 by the other fingers F2 to F5 extended from the side of the device case 1.

Here, the thumb F1 is placed above the key operation section 5 on the front surface of the device case 1, and the vertex portion 15a of the raised portion 15 having a bulging shape is arranged between the index finger F2 and the middle finger F3 of the hand of the user gripping the grip section 14. In this state, the pulp of the index finger F2 is pressed onto the first finger rest area 17 in the raised portion 15 of the battery cover 10 positioned on the rear surface side of the device case 1, and the pulp of each of the other fingers F3 to F5 is placed on the second finger rest area 18 of the raised portion 15.

In this state, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of the index finger F2 of the hand of the user gripping the grip section 14 is pressed onto the sloped surface of the first finger rest area 17 in the raised portion 15 of the battery cover 10 and, in this state, the index finger F2 of the gripping hand is pulled so that the first finger rest area 17 is pulled toward the lower side of the raised portion 15, that is, toward the hand of the user gripping the grip section 14.

Here, when the pulp of the index finger F2 is pressed onto the sloped surface of the first finger rest area 17 in the raised portion 15 of the battery cover 10 and is pulled toward the lower side of the device case 1, that is, toward the hand of the user gripping the grip section 14, the index finger F2 is naturally flexed and pressed along the first finger rest area 17.

Here, even when the index finger F2 of the hand of the user gripping the grip section 14 is pressed onto the first finger rest area 17 along its curve with it being in a bent shape, the pulp of the index finger F2 is not deeply pressed into the button insertion hole 21 in the first finger rest area 17. Accordingly, the operation button 20b is not pushed by the pulp of the index finger F2, and the switch main body 20a does not perform an ON operation.

Also, here, in the gripping style where the user places the thumb F1 on the key operation section 5 so as to operate the key operation section 5 by the thumb F1 and holds the rear surface of the device case 1 by the other fingers F2 to F5 extended from the side of the device case 1, the pulp of each of the other fingers F3 to F5 of the hand of the user gripping the grip section 14 is pressed onto the second finger rest area 18 of the raised portion 15. In this state, the fingers F3 to F5 are placed with them being naturally flexed along the curved surface of the second finger rest area 18.

As a result, with the vertex portion 15a of the raised portion 15 having a bulging shape being arranged between the index finger F2 and the middle finger F3 of the gripping hand of the user, the middle finger F3 to the small finger F5 are placed so as to be aligned in the second finger rest area 18 with them being naturally flexed to wrap the second finger rest area 18 of the raised portion 15. Accordingly, the fingers F3 to F5 are favorably and stably placed along the curved surface of the second finger rest area 18. This allows the user to reliably and favorably grip the grip section 14 of the device case 1 by one hand.

As described above, the grip section 14 is provided to the narrow portion 1b of the device case 1, and has a curved shape projecting so as to be mildly curved from both sides toward the rear surface of the grip section 14. As a result, when gripping the grip section 14 of the device case 1, the user can reliably and favorably grip the grip section 14 of the device case 1 by the hand gripping the grip section 14. Also, the user can fit the hand gripping the grip section 14 to the grip section 14.

Also, the grip section 14 is formed in a bilaterally symmetrical shape with respect to the center position of the device case 1 in the lateral direction. Therefore, when the user grips the grip section 14 of the device case 1 by one hand, the grip section 14 of the device case 1 can be reliably and favorably gripped by the right hand or the left hand of the user. Here, by the lower surface of the grip section 14 being formed in a curved shape mildly curved to project, the gripping hand of the user fits the grip section 14 when the user grips the grip section 14 of the device case 1 by one hand.

When the user grips the grip section 14 of the device case 1 as described above, the thumb F1 is placed above the key operation section 5 without obstructing the display section 4, so that the user can favorably perform key operations on the key operation section 5 by freely moving the thumb F1 above the key operation section 5 while viewing information displayed on the display section 4.

Also, when the user grips the grip section 14 of the device case 1 by one hand, the user presses the pulp of the index finger F2 of the hand gripping the grip section 14 onto the first finger rest area 17 along its curve, with the index finger F2 being in a bent shape, and pulls the first finger rest area 17 toward the lower side of the device case 1, that is, toward the hand of the user gripping the grip section 14. In this state, when the pulp of the index finger F2 is strongly pushed into the button insertion hole 21, the operation button 20b of the lower surface trigger key 20 is pushed by the pulp of the index finger F2 to cause the switch main body 20a of the lower surface trigger key 20 to perform an ON operation.

When the lower surface trigger key 20 performs an ON operation as described above, the optical reading section 6 provided on the rear surface of the broad portion 1a of the device case 1 is driven to cause the laser reading section to emit a laser beam from the first window section 6b of the read projecting portion 6a to the outside of the device case 1, and receives a reflected light of the laser beam so as to read, for example, a barcode of an article. Also, here, through the second window section 6c, the imaging section of the optical reading section 6 captures an image of, for example, an article from which its barcode is to be read.

As described above, this portable terminal includes the battery accommodation section 11 provided with the battery insertion/removal opening 11a on the rear surface side of the device case 1 serving as housing, the battery member 10 which openably covers the battery insertion/removal opening 11a, and the waterproof gasket 26 that is fitted into the groove portion 25a provided in the periphery of the frame section 25 of the battery cover 10 for hermetically sealing the battery accommodation section 11 by the battery cover 10, whereby the structure has been achieved in which the lateral pressure to the waterproof gasket 26 fitted into the groove portion 25a is greater in the corner areas of the waterproof gasket 26 than in the linear areas thereof. Therefore, the durability of the waterproof gasket 26 can be enhanced, so that waterproofness can be ensured for a long period of time.

That is, this portable terminal has been structured such that the lateral pressure to each portion of the waterproof gasket 26 which comes in pressure contact with the inner surface of each corner area of the inner frame 24 of the battery accommodation section 11 is greater than the lateral pressure to each portion of the waterproof gasket 26 in the linear areas that are side portions of the frame section 25 of the battery cover 10. Therefore, the pressure contact of the waterproof gasket 26 between the inner frame 24 of the battery accommodation section 11 and the frame section 25 of the battery cover 10 can be almost equally achieved. Accordingly, the durability of the waterproof gasket 26 can be enhanced, so that waterproofness can be ensured for a long period of time. In addition, the replacement life of the waterproof gasket 26 can be extended even when the battery cover 10 is repeatedly opened and closed.

Also, in this portable terminal, the width of the groove portion 25*a* provided in the frame section 25 of the battery cover 10 is formed narrower in the corner areas of the groove portion 25*a* than in the linear areas thereof. Therefore, the lateral pressure to the waterproof gasket 26 is greater in its corner areas than in its linear areas. As a result, the compression amount of each portion of the waterproof gasket 26 which comes in pressure contact with each corner area of the inner frame 24 of the battery accommodation section 11 can be larger than the compression amount of each portion of the waterproof gasket 26 which comes in pressure contact with each linear area that is a side portion of the inner frame 24 of the battery accommodation section 11.

Accordingly, in this portable terminal, the lateral pressure to each portion of the waterproof gasket 26 which comes in pressure contact with each corner area of the inner frame 24 of the battery accommodation section 11 can be greater than the lateral pressure to each portion of the waterproof gasket 26 which comes in pressure contact with each linear area that is a side portion of the inner frame 24 of the battery accommodation section 11. Therefore, the entire peripheral area of the waterproof gasket 26 can be almost equally compressed. As a result, the durability of the waterproof gasket 26 can be enhanced, so that waterproofness by the waterproof gasket 26 can be ensured for a long period of time.

Also, in this portable terminal, each corner area of the inner frame 24 of the battery accommodation section 11 is constituted by the arc portion 24*b*, and each corresponding corner area of the frame section 25 of the battery cover 10 is constituted by the arc portion 25*b*. Therefore, when the frame section 25 of the battery cover 10 including the waterproof gasket 26 is inserted into the inner frame 24 of the battery accommodation section 11, the expansion of each portion of the waterproof gasket 26 between each arc portion 25*b* in the corner areas of the frame section 25 of the battery cover 10 and each arc portion 24*b* in the corner areas of the inner frame 24 of the battery accommodation section 11 can be reduced by the lateral pressure of the waterproof gasket 26 being distributed along the arc of each of the arc portions 25*b* and 24*b*.

Also, in this portable terminal, the inner wall surface 24*a* of the inner frame 24 of the battery accommodation section 11 is provided with the draft angle θ gradually widened from the bottom side of the battery accommodation section 11 toward the battery insertion/removal opening 11*a* side. Therefore, the friction resistance of the waterproof gasket 26 with respect to the inner wall surface 24*a* of the inner frame 24 when the frame section 25 of the battery cover 10 including the waterproof gasket 26 is inserted into the inner frame 24 of the battery accommodation section 11 can be reduced by the presence of the draft angle θ. Therefore, the frame section 25 of the battery cover 10 including the waterproof gasket 26 can be smoothly inserted into the inner frame 24 of the battery accommodation section 11, plus twisting and cutting of the waterproof gasket 26 can be prevented.

Also, this portable terminal is structured such that the battery cover 10 rotates centering on the fulcrum projection portion 10*a* at the end on the lower side so as to open and close the battery insertion/removal opening 11*a* of the battery accommodation section 11. Therefore, the frame section 25 of the battery cover 10 can be gradually inserted into the inner frame 24 of the battery accommodation section 11 from the fulcrum projection portion 10*a* of the battery cover 10 toward its opposite side. Accordingly, the waterproof gasket 26 provided on the outer periphery of the frame section 25 can be favorably inserted while gradually coming in pressure contact with the inner wall surface 24*a* of the inner frame 24 of the battery accommodation section 11.

That is, in the portable terminal, when the battery cover 10 is rotated centering on the fulcrum projection portion 10*a* to cause the frame section 25 of the battery cover 10 to be inserted into the inner frame 24 of the battery accommodation section 11, the waterproof gasket 26 gradually comes in pressure contact with the inner wall surface 24*a* of the inner frame 24 from the lower side toward the upper side on the fulcrum projection portion 10*a* side in accordance with the rotation of the battery cover 10. Therefore, the frame section 25 can be smoothly and favorably inserted into the inner frame 24.

Also, in this portable terminal, the area surrounded by the groove portion 25*a* provided in the frame section 25 of the battery cover 10 has a shape where the length in the width direction orthogonal to the direction extending away from the fulcrum projection portion 10*a* of the battery cover 10 gradually increases with distance from the fulcrum projection portion 10*a*. As a result, the outer periphery of the frame section 25 of the battery cover 10 and the inner wall surface 24*a* of the inner frame 24 of the battery accommodation section 11 are formed in a folding-fan shape that gradually widens with distance from the fulcrum projection portion 10*a*.

Accordingly, in this portable terminal, when the battery cover 10 is rotated centering on the fulcrum projection portion 10*a* to cause the frame section 25 of the battery cover 10 to be inserted into the inner frame 24 of the battery accommodation section 11, the frame section 25 of the battery cover 10 can be inserted into the inner frame 24 of the battery accommodation section 11 in the direction in which the shape gradually widens from the fulcrum projection portion 10*a* side. Therefore, the frame section 25 can be smoothly and favorably inserted into the inner frame 24, plus twisting and cutting of the waterproof gasket 26 can be favorably prevented.

Also, in this portable terminal, the area surrounded by the groove portion 25*a* provided in the frame section 25 of the battery cover 10 has a shape where the end portion located away from the fulcrum projection portion 10*a* of the battery cover 10 mildly projects and is curved toward the direction away from the fulcrum projection portion 10*a* of the battery cover 10. Therefore, at the end portion located away from the fulcrum projection portion 10*a* of the battery cover 10, the waterproof gasket 26 can smoothly and reliably come in pressure contact with the inner wall surface 24*a* of the inner frame 24. As a result, waterproofness can be ensured.

That is, in this portable terminal, when the battery cover 10 is rotated centering on the fulcrum projection portion 10*a* of the battery cover 10 to cause the frame section 25 to be inserted into the inner frame 24, the waterproof gasket 26 positioned at the curved portion 25*c* of the frame section 25 located in the direction away from the fulcrum protrusion portion 10*a* can gradually come in pressure contact with the inner surface of the curved portion 24c of the inner frame 24 along its curve. As a result, the waterproof gasket 26 can smoothly and reliably come in pressure contact with the curved portion 24c of the inner frame 24, whereby waterproofness can be ensured.

The draft angle θ of the inner frame 24 of the battery accommodation section 11 has a small inclination angle on the fulcrum protrusion portion 10a side of the battery cover, and has a large inclination angle in the curved part 24c on the end side located away from the fulcrum projection portion 10a. Therefore, when the frame section 25 of the battery cover 10 is inserted into the inner frame 24 of the battery accommodation section 11, the friction resistance of the waterproof gasket 26 with respect to the curved part 24c of the inner frame 24 located away from the fulcrum projection portion 10a of the battery cover 10 can be reduced. As a result, the frame section 25 of the battery cover 10 can be smoothly and favorably inserted into the inner frame 24 of the battery accommodation section 11.

In the above-described embodiment, the structure has been described in which the width of the groove portion 25a of the battery cover 10 where the waterproof gasket 26 is fitted is narrower in the corner areas of the groove portion 25a than in the linear areas thereof, whereby the lateral pressure to the waterproof gasket 26 is greater in its corner areas than its linear areas. However, the present invention is not limited thereto. For example, a structure may be adopted in which a space that is narrower in the corner areas of the battery cover 10 and the battery insertion/removal opening 11a than in their linear areas is provided between the periphery of the battery cover 10 and the periphery of the battery insertion/removal opening 11a, whereby the lateral pressure to the waterproof gasket 26 is greater in its corner areas than in its linear areas.

In that structure, the groove width of the groove portion 25a where the waterproof gasket 26 is inserted and attached is designed to be constant over the entire periphery of the groove portion 25a so that the projection length of the waterproof gasket 26 projecting from the inside of the groove portion 25a to the outside is constant. With this structure, by the space between the periphery of the battery cover 10 and the periphery of the battery insertion/removal opening 11a being narrower in the corner areas of the battery cover 10 and the battery insertion/removal opening 11a than in the linear areas thereof, the lateral pressure to the waterproof gasket 26 can be greater in its corner areas than in its linear areas. Accordingly, operations and effects similar to those of the above-described embodiment can be achieved.

Also, in the above-described embodiment, the groove portion 25a where the waterproof gasket 26 is fitted is provide in the frame section 25 of the battery cover 10. However, the present invention is not limited thereto. For example, a structure may be adopted in which the draft angle θ is not provided to the inner frame of the battery accommodation section 11, and a groove portion where the waterproof gasket 26 is fitted is provided in the inner frame 24 of the battery accommodation section 11.

Also, in the above-described embodiment, the battery insertion/removal opening 11a of the battery accommodation section 11 is openably covered by the battery cover 10. However, the present invention is not necessarily required to have this structure where the battery insertion/removal opening 11a of the battery accommodation section 11 is openably covered by the battery cover 10. For example, the present invention can be applied to a structure where a connection terminal for connecting the device case 1 to an external device is openably covered by a terminal cover, or a structure where a card accommodation section for a memory card that is removably attached to the inside of the device case 1 is openably covered by a card cover.

Furthermore, in the above-described embodiment, the display section 4 and the key operation section 5 are provided on the surface of the device case 1. However, the present invention is not limited thereto. For example, the present invention may be applied to a portable terminal where an input display section having a key operation section constituted by transparent touch panel and a display panel laminated thereon is provided on the surface of the device case 1.

While the present invention has been described with reference to the preferred embodiments, it is intended that the invention be not limited by any of the details of the description therein but includes all the embodiments which fall within the scope of the appended claims.

What is claimed is:

1. A battery cover structure comprising:
   a battery accommodation section which has a battery insertion/removal opening provided on one surface side of a housing;
   a battery cover which openably covers the battery insertion/removal opening; and
   a gasket which is fitted into a groove provided in a periphery of the battery cover or a periphery of the battery insertion/removal opening so as to hermetically seal the battery accommodation section by the battery cover,
   wherein lateral pressure to the gasket fitted into the groove is greater in corner areas of the gasket than in linear areas of the gasket.

2. The battery cover structure according to claim 1, wherein the lateral pressure to the gasket is greater in the corner areas of the gasket than in the linear areas of the gasket by a space being provided which is positioned between the periphery of the battery cover and the periphery of the battery insertion/removal opening and is narrower in corner areas of the battery cover and the battery insertion/removal opening than in linear areas of the battery cover and the battery insertion/removal opening.

3. The battery cover structure according to claim 1, wherein the lateral pressure to the gasket is greater in the corner areas of the gasket than in the linear areas of the gasket by a width of the groove being formed to be narrower in corner areas of the groove than in linear areas of the groove.

4. The battery cover structure according to claim 1, wherein the groove is provided in the periphery of the battery cover, the battery accommodation section has an inner wall surface corresponding to the battery insertion/removal opening, and the inner wall surface is provided with a draft angle that gradually widens from a bottom side of the battery accommodation section toward the battery insertion/removal opening side.

5. The battery cover structure according to claim 1, wherein the battery cover rotates centering on a fulcrum portion on one end of the battery cover so as to open or close the battery insertion/removal opening.

6. The battery cover structure according to claim 5, wherein an area surrounded by the groove has a shape where a length in a width direction orthogonal to a direction extending away from the fulcrum portion of the battery cover gradually increases with distance from the fulcrum portion.

7. The battery cover structure according to claim 5, wherein an area surrounded by the groove has a shape where an end portion located away from the fulcrum portion of the battery cover mildly projects and is curved toward a direction extending away from the fulcrum portion of the battery cover.

8. The battery cover structure according to claim 4, wherein the draft angle is small on a side of a fulcrum portion provided on one end of the battery cover and is large on a side of an end portion located away from the fulcrum portion of the battery cover.

9. A portable terminal comprising:
an accommodation section which has an opening provided on one surface side of a housing;
a cover member which openably covers the opening; and
a gasket which is fitted into a groove provided in a periphery of the cover member or a periphery of the opening so as to hermetically seal the accommodation section by the cover member,
wherein lateral pressure to the gasket fitted into the groove is greater in corner areas of the gasket than in linear areas of the gasket.

10. The portable terminal according to claim 9, wherein the lateral pressure to the gasket is greater in the corner areas of the gasket than in the linear areas of the gasket by a space being provided which is positioned between the periphery of the cover member and the periphery of the opening and is narrower in corner areas of the cover member and the opening than in linear areas of the cover member and the opening.

11. The portable terminal according to claim 9, wherein the lateral pressure to the gasket is greater in the corner areas of the gasket than in the linear areas of the gasket by a width of the groove being formed to be narrower in corner areas of the groove than in linear areas of the groove.

12. The portable terminal according to claim 9, wherein the groove is provided in the periphery of the cover member, the accommodation section has an inner wall surface corresponding to the opening, and the inner wall surface is provided with a draft angle that gradually widens from a bottom side of the accommodation section toward the opening side.

13. The portable terminal according to claim 9, wherein the cover member rotates centering on a fulcrum portion on one end of the cover member so as to open or close the opening.

14. The portable terminal according to claim 13, wherein an area surrounded by the groove has a shape where a length in a width direction orthogonal to a direction extending away from the fulcrum portion of the cover member gradually increases with distance from the fulcrum portion.

15. The portable terminal according to claim 13, wherein an area surrounded by the groove has a shape where an end portion located away from the fulcrum portion of the cover member mildly projects and is curved toward a direction extending away from the fulcrum portion of the cover member.

16. The portable terminal according to claim 12, wherein the draft angle is small on a side of a fulcrum portion provided on one end of the cover member and is large on a side of an end portion located away from the fulcrum portion of the cover member.

* * * * *